United States Patent
Higgins (10) Patent No.: US 10,137,897 B2
(45) Date of Patent: Nov. 27, 2018

(54) SYSTEMS AND METHODOLOGIES FOR MODIFYING A VEHICLE OPERATING PROFILE

(71) Applicant: TOYOTA MOTOR ENGINEERING & MANUFACTURING NORTH AMERICA, INC., Erlanger, KY (US)

(72) Inventor: Christopher M. Higgins, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 0 days.

(21) Appl. No.: 15/180,479

(22) Filed: Jun. 13, 2016

(65) Prior Publication Data

US 2017/0355371 A1    Dec. 14, 2017

(51) Int. Cl.

| | |
|---|---|
| *B60W 30/182* | (2012.01) |
| *B60W 40/12* | (2012.01) |
| *B60W 10/06* | (2006.01) |
| *B60W 10/18* | (2012.01) |
| *B60W 10/20* | (2006.01) |
| *B60W 10/30* | (2006.01) |
| *B60W 50/08* | (2012.01) |
| *G05D 1/00* | (2006.01) |
| *B60W 50/14* | (2012.01) |

(52) U.S. Cl.
CPC .......... *B60W 30/182* (2013.01); *B60W 10/06* (2013.01); *B60W 10/18* (2013.01); *B60W 10/20* (2013.01); *B60W 10/30* (2013.01); *B60W 40/12* (2013.01); *B60W 50/085* (2013.01); *B60W 50/14* (2013.01); *G05D 1/0088* (2013.01); *B60W 2050/146* (2013.01); *B60Y 2300/52* (2013.01)

(58) Field of Classification Search
None
See application file for complete search history.

(56) References Cited

U.S. PATENT DOCUMENTS

| | | | |
|---|---|---|---|
| 7,265,455 | B2 | 9/2007 | Oyobe et al. |
| 8,145,376 | B2 | 3/2012 | Sherony |
| 8,424,630 | B2 | 4/2013 | Lenton |
| 8,447,505 | B2 | 5/2013 | Crombez et al. |
| 9,043,060 | B2 | 5/2015 | Sujan et al. |
| 9,079,586 | B2 | 7/2015 | Crombez |
| 9,156,473 | B2 | 10/2015 | Clarke et al. |

(Continued)

OTHER PUBLICATIONS

Robert Oshana & Mark Kraeling, Software Engineering for Embedded Systems: Methods, Practical Techniques, and Applications, 2013 (Year: 2013).*

*Primary Examiner* — Tamara L Weber
(74) *Attorney, Agent, or Firm* — Oblon, McClelland, Maier & Neustadt, L.L.P.

(57) ABSTRACT

A system and method that detects, using processing circuitry, a predetermined energy condition. The processing circuitry determines a geographic location of a vehicle, identifies at least one energy station as a function of a plurality of factors, determines a vehicle range based on an energy level of the vehicle and a first mode of vehicle operation, determines whether an energy saving condition is satisfied based on the vehicle range, a location of the at least one energy station, and the geographical location of the vehicle, and enters an economy mode when the energy saving condition is satisfied.

18 Claims, 6 Drawing Sheets

(56) References Cited

U.S. PATENT DOCUMENTS

| | | | |
|---|---|---|---|
| 2008/0162008 A1* | 7/2008 | Kojima | F16H 61/0213 |
| | | | 701/55 |
| 2010/0063717 A1 | 3/2010 | Proefke et al. | |
| 2011/0153141 A1 | 6/2011 | Beechie et al. | |
| 2011/0160992 A1* | 6/2011 | Crombez | B60W 30/182 |
| | | | 701/123 |
| 2013/0173097 A1* | 7/2013 | Jotanovic | G01C 21/3469 |
| | | | 701/22 |
| 2014/0257662 A1 | 9/2014 | Takeuchi et al. | |
| 2015/0051763 A1* | 2/2015 | Enomoto | B60L 11/1862 |
| | | | 701/22 |
| 2015/0149017 A1 | 5/2015 | Attard et al. | |
| 2015/0266379 A1* | 9/2015 | Bellin | B60K 35/00 |
| | | | 701/36 |
| 2015/0345965 A1 | 12/2015 | Semsey | |
| 2016/0167643 A1* | 6/2016 | Tabanoglu | B60W 20/00 |
| | | | 701/22 |
| 2017/0087999 A1* | 3/2017 | Miller | G01C 21/00 |

* cited by examiner

| Identifier | Geographical location | Energy type available | Information |
|---|---|---|---|
| 0001 | 38°49'22.4"N 77°04'04.8"W | Electrical | 24/7 |
| 0002 | 38°50'18.8"N 77°04'31.6"W | Gas-electrical | 6AM-9PM |
| 0003 | 38°50'19.0"N 77°04'59.4"W | Gas | 24/7 |

SYSTEMS AND METHODOLOGIES FOR MODIFYING A VEHICLE OPERATING PROFILE

BACKGROUND

A variety of driving patterns may be available in a vehicle with each driving pattern optimized for a different situation. For example, there can be more aggressive and less aggressive driving patterns. U.S. Pat. No. 9,079,586 B2 entitled "Method and system for extending an operating range of a motor vehicle" by Crombez describes a method and a system for entering an economy mode of operation based on the vehicle fuel level The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention. The foregoing paragraph has been provided by way of general introduction, and is not intended to limit the scope of the following claims. The described embodiments, together with further advantages, will be best understood by reference to the following detailed description taken in conjunction with the accompanying drawings.

SUMMARY

The present disclosure relates to a system and method that detects, using processing circuitry, a predetermined energy condition. The processing circuitry determines a geographic location of a vehicle, identifies at least one energy station as a function of a plurality of factors, determines a vehicle range based on an energy level of the vehicle and a first mode of vehicle operation, determines whether an energy saving condition is satisfied based on the vehicle range, a location of the at least one energy station, and the geographical location of the vehicle, and enters an economy mode when the energy saving condition is satisfied.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Referring now to the drawings, wherein like reference numerals designate identical or corresponding parts throughout several views, the following description relates to a system and associated methodology for modifying a vehicle operating profile.

The system and associated methodology modify the driving, acceleration, and vehicle operation profiles based on a proximity to an energy station (e.g., gas station, service station). A variety of driving patterns associated with different situations may be available in autonomous/semi-autonomous vehicles. For example, the driving patterns may include an aggressive driving pattern and a less aggressive driving pattern. For example, when a vehicle is far away from any energy station (e.g., gas stations), the vehicle may accelerate less quickly to conserve gas. The system and associated methodology check to see whether the energy station is open and further determine whether the vehicle is capable of reaching the energy station's location.

In one aspect, the method described herein permits a driver to select a fuel/charge station and modify a driving pattern of the vehicle so that the vehicle can reach the destination. The vehicle may also use knowledge of the onboard energy in combination with location information, and other information to present options to the driver.

In addition, a problem associated with alternative fuel powered vehicles is a dearth of alternative fuel stations. Similarly, in rural sparsely populated, or less developed geographic areas the number of fuel stations may be limited and those stations may be located at great distances from one another. If the vehicle determines that it cannot reach the destination, the vehicle starts to change a driving pattern so that the vehicle can reach the destination. For example, if the acceleration profile is set to accelerate quickly (which expends fuel/charge resources), the acceleration may be set to accelerate less quickly. Another example is to turn off unnecessary functions in the vehicle to extend the range (e.g., HVAC system, radio, auxiliary power supplies).

Figure 1:
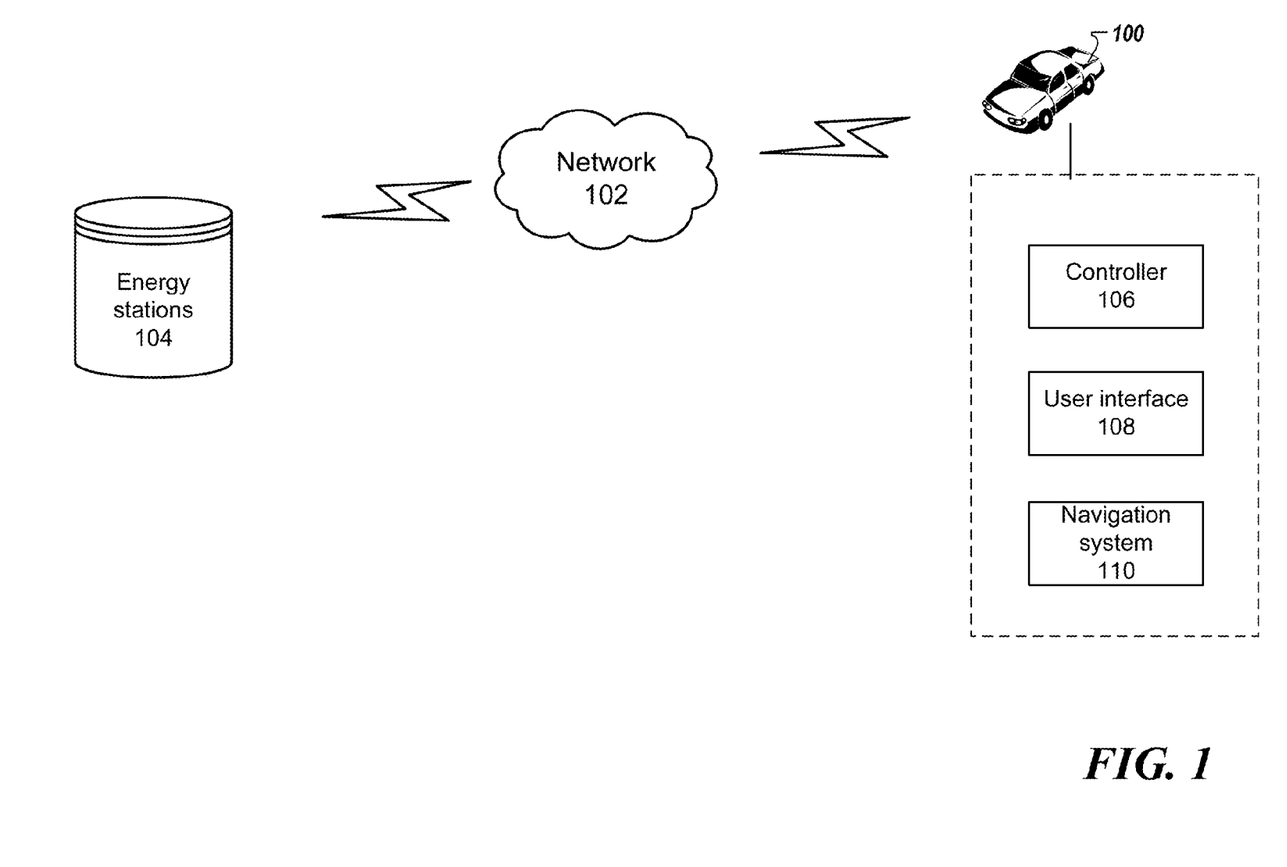
FIG. 1 is a schematic diagram of a system for modifying a vehicle operating profile according to one example.
Figure 6:
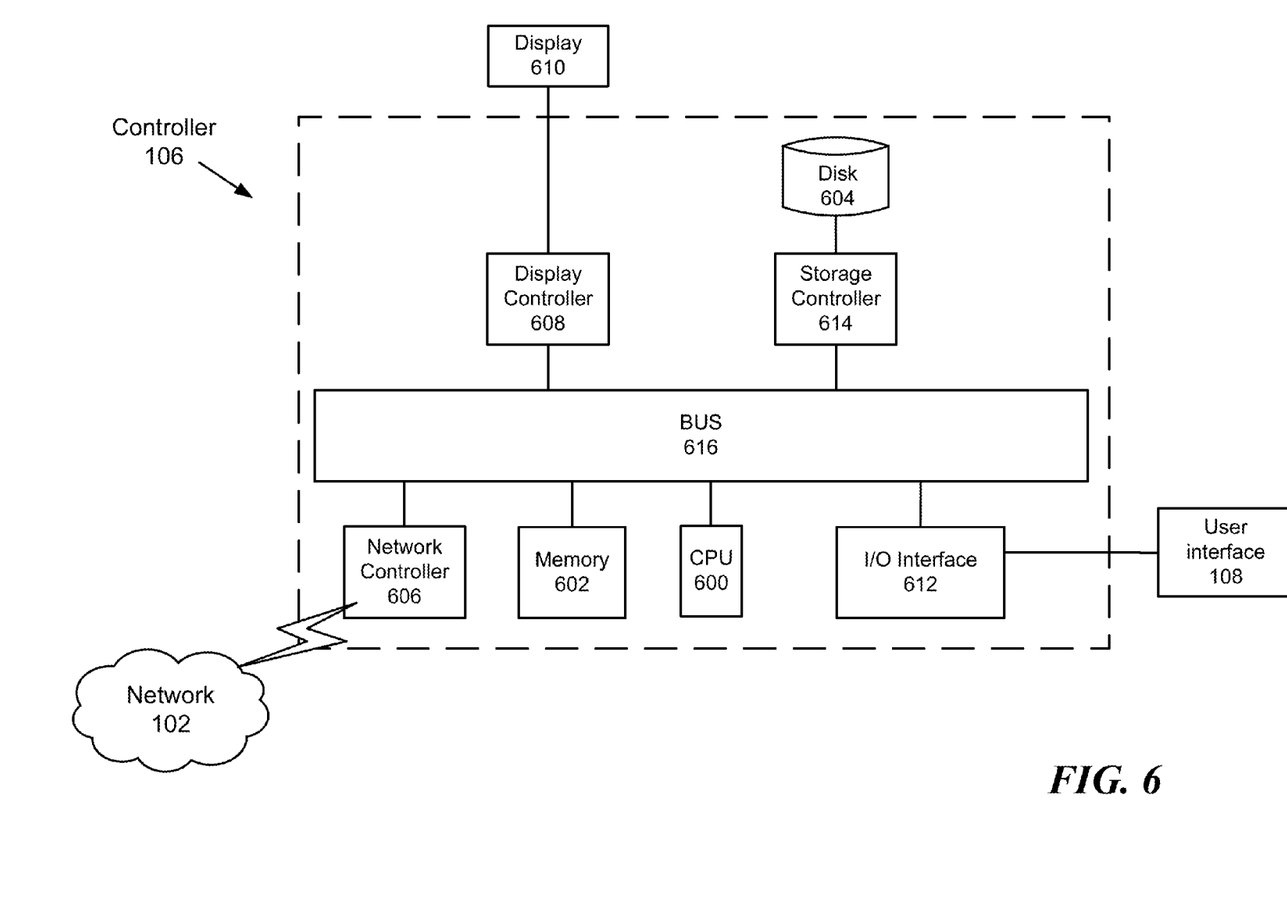
FIG. 6 is an exemplary block diagram of a controller according to one example.

FIG. 1 is a schematic diagram of a system for modifying a vehicle operating profile according to one example. The system may include an autonomous/semi-autonomous vehicle 100, an energy stations database 104, and a network 102. The autonomous/semi-autonomous vehicle 100 may include a controller 106, a user interface 108, and a navigation system 110. The controller 106 may include a CPU 600 and a memory 602, as shown in FIG. 6.

The autonomous/semi-autonomous vehicle 100 may be an automobile such as a sedan, a truck, a van, a sport utility vehicle, or another type of automobile. The energy source of the autonomous/semi-autonomous vehicle 100 may include, but are not limited to, electric,hydrogen, ethanol, liquefied natural gas (LNG), propane, compressed natural gas (CNG), gasoline, biodiesel, and diesel.

The system includes the user interface 108 for interacting with a driver or a passenger of vehicle 100. The user interface 108 may include various input and output elements such as lamps, lighted icons, a message center, a microphone, a video display, switches, a touch screen, knobs, buttons, and/or any other type of user interface as would be understood by one of ordinary skill in the art. The user interface 108 may also include one or more speakers (e.g., speakers of a vehicle audio system). For example, the system may provide various notifications (e.g., entering an economy mode) via the one or more speakers.

The energy stations database 104 may be stored in the memory 602 and/or a cloud based database. The energy stations database 104 includes information regarding energy stations (e.g., gas stations, alternative fuel stations) near the geographic location of the autonomous/semi-autonomous vehicle 100. The energy stations database 104 may also include a measure of density of the energy stations near the geographic location of the autonomous/semi-autonomous vehicle 100. The energy station refers to a station that may include at least one of gas, electrical charging, diesel, hydrogen source or the like. The energy stations database 104 may be populated or updated by connecting to online resources such as an alternative fuels data center (e.g., U.S. Department of energy).

The navigation system 110 may be a dead-reckoning based system which determine the vehicle location via compass and speed sensors as it would be understood by one of ordinary skill in the art. The navigation system 110 is coupled to the controller 106 and may include a receiver and/or other localization circuitry as would be understood by one of ordinary skill in the art. The receiver is configured to at least facilitate determining a geographic location of the autonomous/semi-autonomous vehicle 100.

The geographic location of the autonomous/semi-autonomous vehicle 100 may be determined by a plurality of methods. The autonomous/semi-autonomous vehicle's 100 location can be determined via various satellite-based positioning systems known in the art, such as GPS (Global Positioning System). For example, the autonomous/semi-autonomous vehicle's 100 may include a location detector. The location detector may be a GPS module for detecting a current geographical location of the autonomous/semi-autonomous vehicle 100. In one embodiment, the autonomous/semi-autonomous vehicle's 100 location is determined via a cellular tower with which communication has been established using current technology such as GMS (Global System for Mobile) localization, triangulation, Bluetooth, hotspots, WiFi detection, or other methods as would be understood by one of ordinary skill in the art.

The network 102 may include the Internet or any other network capable of communicating data between vehicles, databases, and the like. Suitable networks can include or interface with any one or more of a local intranet, a PAN (Personal Area Network), a LAN (Local Area Network), a WAN (Wide Area Network), a MAN (Metropolitan Area Network), a VPN (Virtual Private Network), or a SAN (storage area network). Furthermore, communications may also include links to any of a variety of wireless networks, including WAP (Wireless Application Protocol), GPRS (General Packet Radio Service), GSM (Global system for Mobile Communication), CDMA (Code Division Multiple Access), TDMA (Time Division Multiple Access), cellular phone networks, GPS (Global Positioning System), CDPD (Cellular digit packet data), Bluetooth radio, or an IEEE 802.11 based radio frequency.

The autonomous/semi-autonomous vehicle 100 may operate under a plurality of operation modes. The operation modes may include an economy mode. The economy mode may involve several changes to the driving or operating behavior of the autonomous/semi-autonomous vehicle 100. Such changes may include, but are not limited to, limiting vehicle speed, limiting vehicle acceleration, modifying vehicle acceleration characteristics, and limiting or altering the vehicle climate control system settings. By improving energy (fuel) economy, these types of changes can help to extend the operating range of the autonomous/semi-autonomous vehicle 100. Multiple numbers or types of economy modes of operation may also be provided, such as employing different combinations of changes in the operation of the vehicle. Vehicle operating modes other than such as economy modes may be referred to herein in any fashion, such as normal operating modes.

Figure 2:
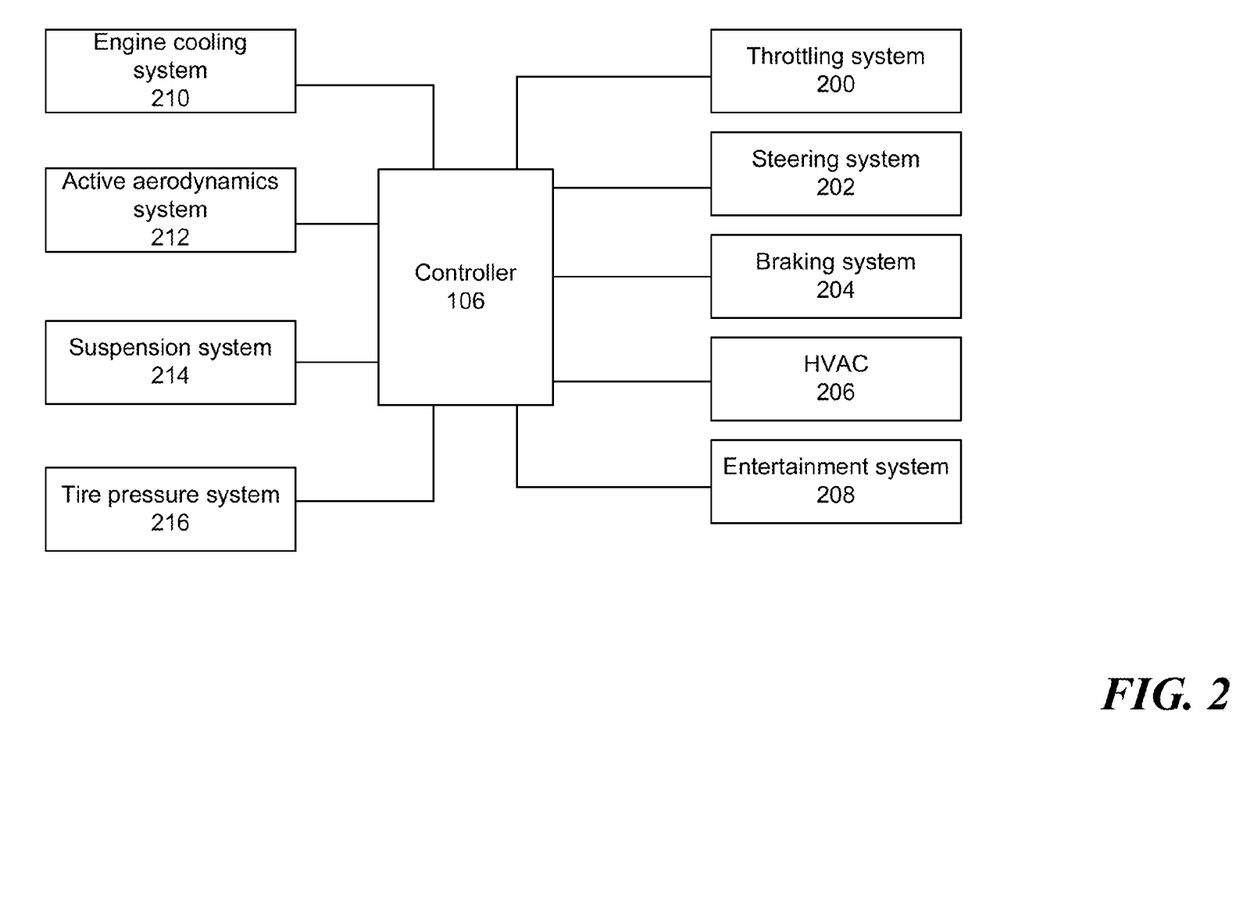
FIG. 2 is a schematic that shows exemplary vehicle control systems according to one example.

FIG. 2 is a schematic that shows exemplary vehicle control systems according to one example. The vehicle 100 may include a throttling system 200, a steering system 202, a braking system 204, a HVAC (heating, ventilating, and air conditioning) system 206, and an entertainment system 208. The controller 106 may provide inputs (e.g., control signals) to one or more of the throttling system 200, the steering system 202, the braking system 204, the HVAC system 206, and the entertainment system 208 over one or more data links (e.g., any wired and/or wireless link or links for transmitting data). For example, based on the destination and the current energy level (e.g., fuel level), the controller 106 may provide control signals to one or more of the throttling system 200, the steering system 202, the braking system 204, the HVAC system 206, and the entertainment system 208 to modify an operation mode (e.g., by decreasing an acceleration rate).

The economy mode may include a number of power saving actions which may be classified in an energy hierarchy according to the fuel savings that each power saving actions provides. The power saving actions may be applied in the economy mode according to the energy hierarchy until the autonomous/semi-autonomous vehicle's 100 range is extended to a suitable range to reach an energy station identified by the methodology described herein. The power saving actions may also be applied based on the user preference. For example, a user may prefer to turn off the entertainment system 208 instead of the HVAC system 206.

The controller 106 may change the acceleration profile. For example, if the acceleration profile is set to accelerate quickly (which expends fuel/charge resources), the acceleration profile can be set to accelerate less quickly. The controller 106 may also reduce power consumption from integrated electronic accessories (e.g., cell phone chargers, MP3 players) by reducing power to or deactivating the system vehicle's electronic devices and power outlets.

In addition to, or alternatively, the controller 106 may deactivate air conditioning, increase blower temperature, decrease blower speed and activate re-circulation, all of which alters the net effect of the HVAC system 206.

For the entertainment system 208, the controller 106 can lower the stereo volume or decrease available stereo channels.

In addition, the controller 106 is also capable of reducing general energy demand by, e.g., dimming or turning off displays (turning non critical displays to black), deactivating power outlets, and turning off daytime running lights (interior and exterior lighting).

The controller 106 may also modify an engine cooling system 210. For example, the controller 106 modifies a grille shutter (e.g., open, close) to control airflow and improve fuel efficiency.

The controller 106 may control an active aerodynamics system 212 (e.g., moveable spoiler, closing the sunroof). The power savings actions may also include modifying the operation of a suspension system 214 (e.g., adjusting vehicle ride height), an auxiliary power system (e.g., turn off phone chargers), a tire pressure system 216 (e.g., adjust tire pressure), or other vehicle systems as would be understood by one of ordinary skill in the art.

Figure 3:
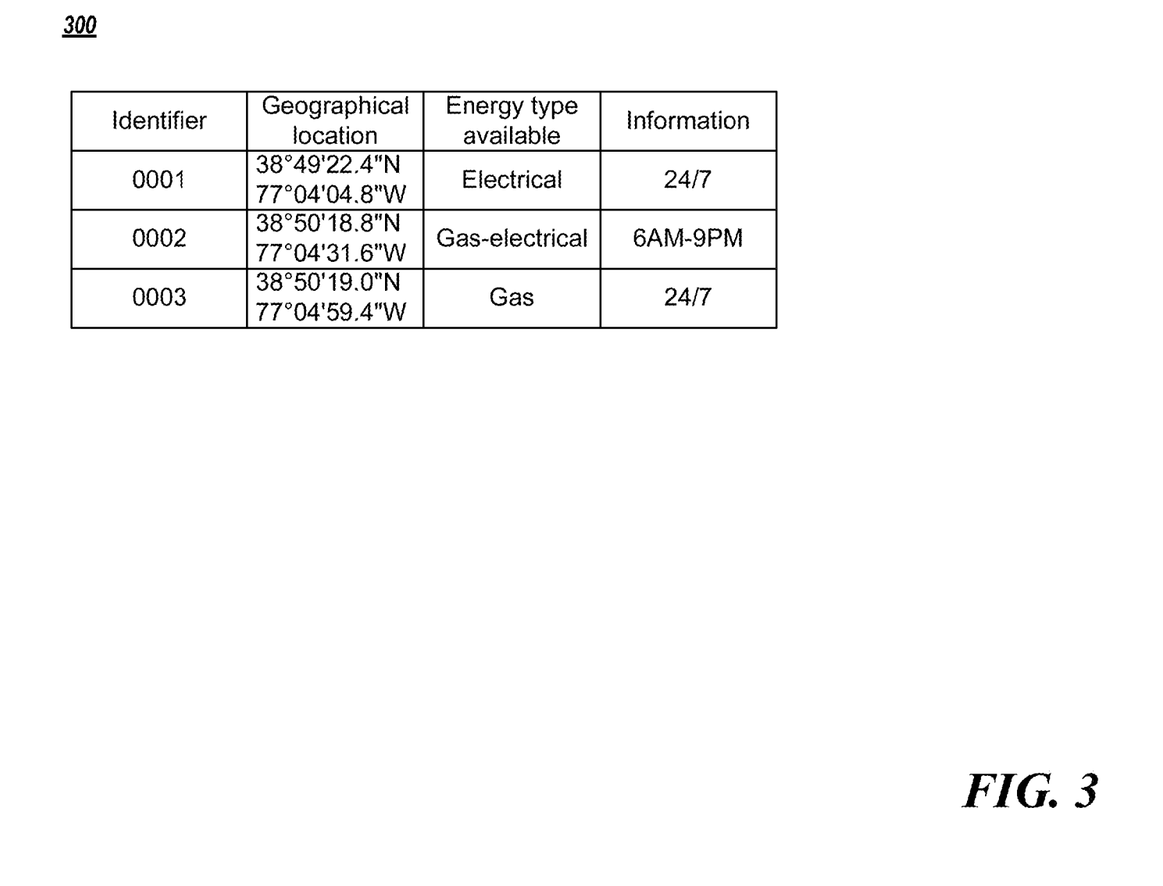
FIG. 3 is an exemplary table for an energy stations database according to one example.

FIG. 3 is an exemplary table for the energy stations database 104 according to one example. Table 300 shows the different fields stored in the energy stations database 104. The table 300 contains an identifier, a geographical location, energy source available, and information (e.g., royalty program, operating hours). The controller 106 may connect to the energy stations database 104 to download from the energy stations database 104 information. The controller 106 may analyze the information to determine a suitable energy station or determine a plurality of energy stations to output to the driver, The autonomous/semi-autonomous vehicle 100 can also provide a comparison of different energy (fuel/charge) stations according to one or more factors (e.g., price). The autonomous/semi-autonomous vehicle 100 can allow the occupant of the autonomous/semi-autonomous vehicle 100 to make the choice (e.g., select an energy station) or the autonomous/semi-autonomous vehicle 100 can make the choice of station automatically. Once an energy station is selected, the autonomous/semi-autonomous vehicle 100 may determine if there needs to be a change in one or more driving pattern characteristics.

Figure 4:
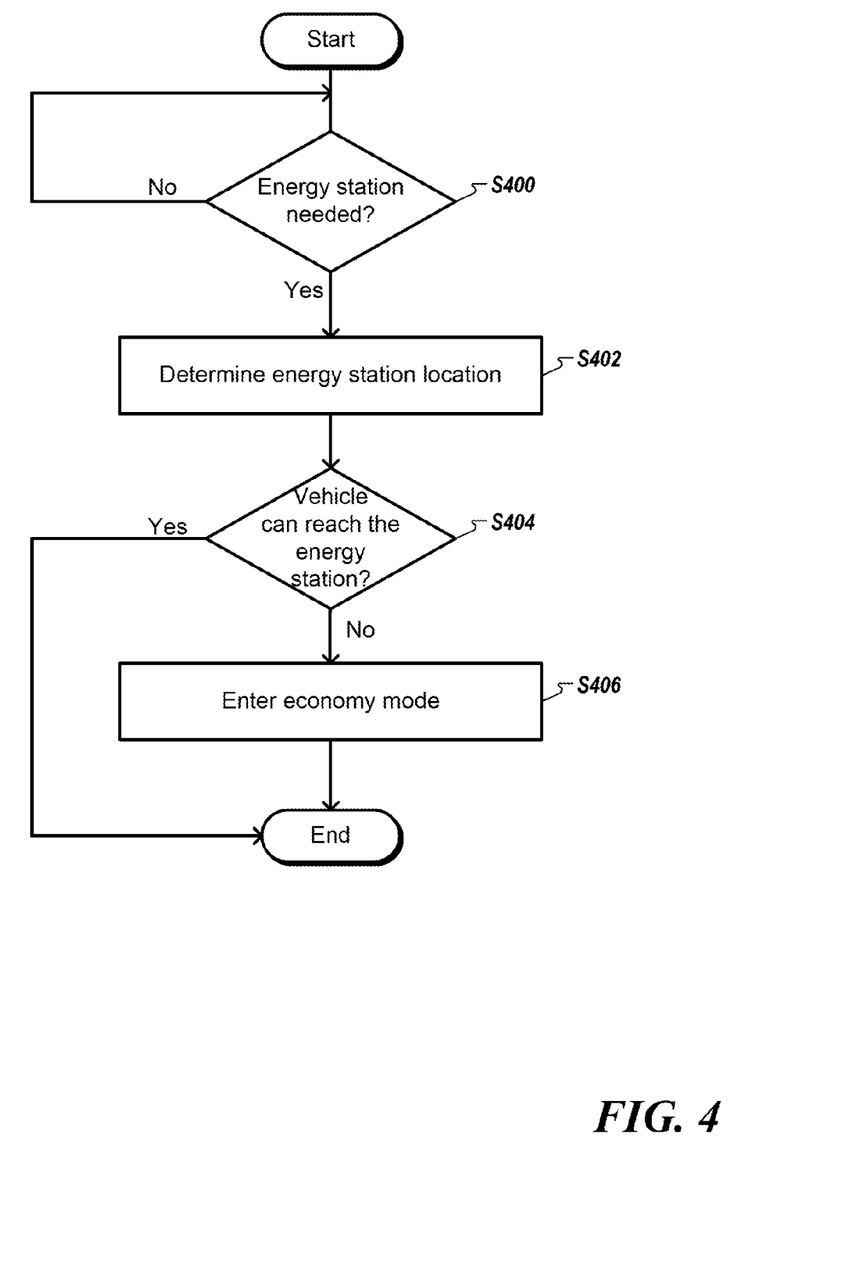
FIG. 4 is a flowchart that shows an exemplary method for modifying a vehicle operating profile according to one example.

FIG. 4 is a flowchart that shows an exemplary method for modifying a vehicle operating profile according to one example. At step S400, the controller 106 may detect a predetermined energy condition that indicates a need for locating an energy station based on a plurality of factors. The plurality of factors may include a current destination. For example, when the vehicle is an autonomous vehicle, the user destination may be known. For example, at the beginning of the trip the user may indicate the destination via the user interface 108. The controller 106 may determine the amount of fuel (or alternative fuel) required to reach the destination. That is, the controller 106 may determine an operation range of the vehicle based on the current energy level. Then, the controller 106 may compare the operation range of the vehicle with the distance to the destination based on the vehicle current location and the user destination as would be understood by one of ordinary skill in the art. In response to determining that there is a need for an energy station, the flow goes to step S402.

In one example, the plurality of factors may include a current energy level. In response to determining that the current energy level is below a predetermined threshold, the flow goes to step S402. The predetermined threshold may be set by the vehicle manufacturer and/or by the user of the vehicle. For example, the user may select 25% as the threshold to refuel. Alternatively or additionally, the predetermined threshold may be a function of the geographic location of the user. For example, when the user is located in a region with sporadic energy stations (e.g., gas station, electrical outlet), a higher threshold may be used as compared with when the location of the vehicle is in a region where the availability of the energy source is more common. The current vehicle location is determined based on any method described previously herein, or any localization method as would be understood by one of ordinary skill in the art. In one example, the geographic location may be determined from an input received from the user of the vehicle via the user interface 108, In one example, the plurality of factors may include a user input. For example, the controller 106 may receive a user input via the user interface 108 indicating a request to go to an energy station. In response to determining that there is a need for an energy station, the flow goes to step S402.

At step S402, an energy station is identified. The energy station may be identified as a function of plurality of factors. The energy station may be automatically identified by the controller 106. Alternatively, the controller 106 may identify one or more energy stations. Then, the one or more energy stations may be presented to the user. The user may select an energy station from the one or more energy stations via the user interface 108.

The energy station may be identified by connecting to the energy stations database 104 via the network 102. Alternatively or additionally, the energy station may be identified based on a user input via the user interface 108. For example, the user may input the name or the geographical location of the energy station.

The plurality of factors may also include one or more of, but not limited to, past visits, operation hours, discounts, navigation features, and price.

For example, the controller 106 may check a user log to determine the one or more energy stations that are frequently visited by the user that are within a predetermined distance from the vehicle current location. The user log may be stored in the memory 602. For example, the controller 106 may determine the frequently visited stations within a 2 miles radius from the vehicle current location.

The factors may include whether the energy station is a part of a network where the user is subscribed to get discounts or reward points. The energy station may be selected based on navigation features such as avoiding tolls, avoiding high crime areas, and avoiding traffic jams. The factors may also include the availability of convenience stores, rating, and availability and ratings of restrooms.

As described previously herein, the energy station may include an ethanol, propane, hydrogen for an internal combustion engine or fuel cell, electricity for a battery, natural gas, gasoline, diesel, and/or any other types of alternative vehicle fuel or conventional vehicle fuel source.

At step S404, the controller 106 determines whether an energy saving condition is satisfied. Thus, a change in the operating mode of the autonomous/semi-autonomous vehicle 100 is required. For example, the controller 106 may determine a traveling distance to the location of the energy station identified at step S402. Then, the controller may compare the traveling distance with an operation range of the vehicle. The operation range of the vehicle is determined based on a current energy level and a current operation mode of the vehicle. When the operation range of the vehicle is below the traveling distance or a predetermined threshold, then a change in the operation mode is required. In response to determining that a change in the operation mode is required, then the process goes to step S406. In response to determining that a change in the operation mode is not required, the process ends.

At step S406, in response to determining that a change in the operating mode is needed, the controller 106 may enter an economy mode. The economy mode alters at least one operating parameter of at least one vehicle system so as to decrease an energy consumption rate of the vehicle as described previously herein.

In one example, the vehicle user or driver is notified that the vehicle has entered an economy mode of operation via the user interface 108.

In certain aspects, the system and associated methodology may determine one or more energy stations based on the destination, current location, and information associated with the energy stations (e.g., operating hours). Once, the one or more energy stations are identified, the controller 106 may enter an economy mode for one or more segments of the route plan. For example, the vehicle may be a hydrogen vehicle with a range of 100 miles. The driver's destination is 200 miles from the current location. The controller 106 may connect to the energy stations database 104 to determine possible energy stations along the route. For example, the controller 106 may determine that hydrogen stations are available every 45 miles (e.g., current location, 45 mi, 90 mi, 135 mi, 180 mi, and 225 mi). The controller 106 identifies the one or more energy stations from the possible energy stations based on information associated with each station. For example, the controller 106 may determine that a station may not be selected if the station will be closed when the user reaches the station. For example, one option is to fuel at the current location, at 90 mi, and at 180 mi. However, the controller 106 determines that the station located at 180 mi will be closed once the driver reaches the station (e.g., the departure time is 6 PM and the station closes at 6:30 PM). Thus, the option is not feasible. The controller 106 may recommend to fuel at the current location, at 45 mi, and at 135 mi. In addition, the system may also consider the overall plan. For example, the system considers the trip from the last filling station to the destination and hack to a station. In the example described above, the vehicle cannot make it from the station located at 135 mi, to the destination and back to the station. After filling at the 135 mi, the vehicle uses 65 miles of range to get to the destination and have only 35 miles of range left. Thus, the driver may have to wait for the energy station located at 180 mi to open the next morning.

Once, the controller 106 identifies the one or more energy stations, the controller 106 may modifies the operating profile of the vehicle (e.g., enter the economy mode) based on the distance between station and when an energy saving condition is satisfied as described previously herein.

In addition, the controller 106 may output a warning that a trip is not feasible when the controller 106 fails to identify possible energy stations. For example, if a driver located in New York City selects Los Angeles as the destination, the controller 106 may output a warning that the trip is not feasible.

Figure 5:
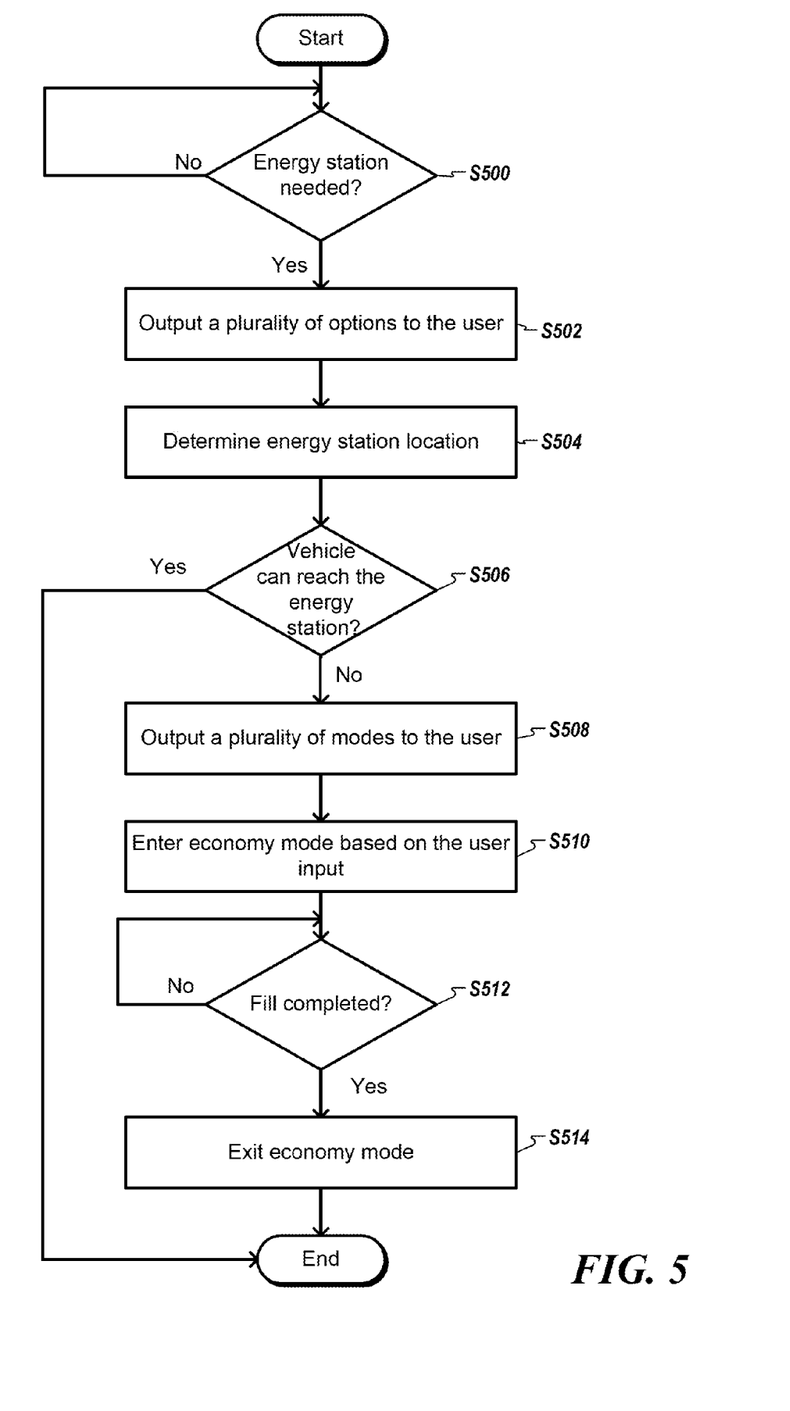
FIG. 5 is a flowchart that shows an exemplary method for modifying a vehicle operating profile according to one example.

FIG. 5 is a flowchart that shows an exemplary method for modifying a vehicle operating profile according to one example. At step S500, the controller 106 determines whether there is a need for locating an energy station based on a plurality of factors as described previously herein.

At step S502, the controller 106 may present to the user with a plurality of options, for example, the controller 106 may present a list of the energy stations that are located near the autonomous/semi-autonomous vehicle's 100 location. The controller 106 may also present the user with a plurality of parameters (options) that may be used to identify the energy station, for example, the availability of a convenience store. The controller 106 may select the energy station based on the user input. When multiple stations satisfy the user selected criteria, the controller 106 may present the multiple stations to the user. Then, the controller 106 may receive a user input identifying an energy station via the user interface 108. In one example, the user's preferable parameters and settings may be stored in the memory 602.

At step S504, the controller 106 determines the energy station's location from the energy stations database 104.

At step S506, the controller 106 determines whether a change in the operating mode is required. For example, by determining whether the estimated vehicle range is within or below a predetermined threshold or percentage of the estimated distance of the vehicle to the location of the energy station identified at step S502. In response to determining that a change in the operation mode is required, then the process goes to step S508. In response to determining that a change in the operation mode is not required, the process ends.

At step S508, the controller 106 may output to the user one or more possible operational modes. For example, a first operation mode may turn off the HVAC system of the autonomous/semi-autonomous vehicle 100 to minimize energy consumption in order to extend the operation range of the vehicle 100 to reach the energy station. A second operation mode may turn off the entertainment system 208 (e.g., television). The user may select a preferable operation mode from the one or more possible operational modes. In one example, the controller 106 may output to the user a required action to minimize energy consumption, and the user may have the option to select when to apply the action. For example, the controller 106 may determine that the entertainment system 208 has to be turned off for a duration of ten minutes within the next hour in order to save enough energy for the autonomous/semi-autonomous vehicle 100 to reach the energy station. Then, the controller 106 may receive an input from the user indicating when to turn off the entertainment system 208.

At step S510, the controller 106 may alter at least one operating parameter of at least one vehicle system based on the user selection at step S508.

At step S512, the controller 106 may actively monitor, whether the vehicle is being or has been refueled. If a refueling condition is detected, the controller 106 restores the operation mode of the vehicle to normal (deactivate the economy mode) at step S514.

In one example, the driver may override the economy mode of operation. That is, the vehicle driver or user could provide a command to exit the economy mode of operation and enter another mode of operation.

Next, a hardware description of the controller 106 according to exemplary embodiments is described with reference to FIG. 6. In FIG. 6, the controller 106 includes a CPU 600 which performs the processes described herein. The process data and instructions may be stored in memory 602. These processes and instructions may also be stored on a storage medium disk 604 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the controller 106 communicates, such as a server or computer.

Further, the claimed advancements ay be provided as a utility application, background daemon, or component of an operating system, or combination thereof, executing in conjunction with CPU 600 and an operating system such as Microsoft Windows, UNIX, Solaris, LINUX, Apple MAC-OS and other systems known to those skilled in the art In order to achieve the controller 106, the hardware elements may be realized by various circuitry elements, known to those skilled in the art. For example, CPU 600 may be a Xenon or Core processor from Intel of America or an Opteron processor from AMD of America, or may be other processor types that would be recognized by one of ordinary skill in the art. Alternatively, the CPU 600 may be implemented on an FPGA, ASIC, PLD or using discrete logic circuits, as one of ordinary skill in the art would recognize. Further, CPU 600 may be implemented as multiple processors cooperatively working in parallel to perform the instructions of the inventive processes described above.

The controller 106 in FIG. 6 also includes a network controller 606, such as an Intel Ethernet PRO network interface card from Intel Corporation of America, for interfacing with network. As can be appreciated, the network can be a public network, such as the Internet, or a private network such as LAN or WAN network, or any combination thereof and can also include PSTN or ISDN sub-networks.

The network can be wireless such as a cellular network including EDGE, 3G and 4G wireless cellular systems. The wireless network can also be WiFi, Bluetooth, or any other wireless form of communication that is known.

The controller 106 further includes a display controller 608, such as a NVIDIA GeForce GTX, TEGRA, TITAN X, Quadro graphics adaptor from NVIDIA Corporation of America for interfacing with display 610, or other graphics processing unit (GPU) as would be understood be one of ordinary skill in the art. The controller 106 may include a NVIDIA DRIVE PX 2 or DRIVE CX.

A general purpose I/O interface 612 interfaces with the user interface 108.

The general purpose storage controller 614 connects the storage medium disk 604 with communication bus 616, which may be an ISA, EISA, VESA, PCI, or similar, for interconnecting all of the components of the controller 106. A description of the general features and functionality of the display 610, as well as the display controller 608, storage controller 614, network controller 606, and general purpose 110 interface 612 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in the circuitry on a single chipset.

The present disclosure is not limited to the specific circuit elements described herein, nor is the present disclosure limited to the specific sizing and classification of these elements. Additionally, some implementations may be performed on modules or hardware not identical to those described. Accordingly, other implementations are within the scope that may be claimed.

The above-described hardware description is a non-limiting example of corresponding structure for performing the functionality described herein.

A system which includes the features in the foregoing description provides numerous advantages to users. In particular, the system may alter the operation of one or more vehicle control systems to extend the operating range of the vehicle in order to reach an energy station identified based on a plurality of factors without running out of fuel.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for modifying a vehicle operating profile, the method comprising:

determining, using processing circuitry, a predetermined energy condition based upon at least one input to the processing circuitry;

determining, using the processing circuitry, a geographic location of a vehicle based upon the at least one input to the processing circuitry;

identifying, using the processing circuitry, at least one energy station as a function of a plurality of factors;

determining, using the processing circuitry, a vehicle range based on an energy level of the vehicle and a first mode of vehicle operation;

determining, using the processing circuitry, whether an energy saving condition is satisfied based on the vehicle range, a location of the at least one energy station, and the geographical location of the vehicle;

entering an economy mode when the energy saving condition is satisfied;

determining, using the processing circuitry, whether a fill is completed based upon the at least one input to the processing circuitry; and exiting the economy mode in response to determining that the fill is completed, wherein, in the economy mode:

the method includes sending a control signal to at least one vehicle system, and the at least one vehicle system alters at least one operating parameter based upon the control signal.

2. The method of claim 1, wherein the plurality of factors includes an energy source category, operating hours, past visits, and prices.

3. The method of claim 2, wherein the energy source category includes at least one of ethanol, hydrogen, electricity, gasoline, diesel, and natural gas.

4. The method of claim 1, further comprising:
identifying a plurality of energy stations based on user preferences;
outputting the plurality of energy stations to a user interface; and
receiving a user input indicating a selected energy station.

5. The method of claim 1, wherein the economy mode includes one of limiting vehicle speed, limiting vehicle acceleration, modifying vehicle acceleration characteristics, and altering vehicle climate control system settings.

6. The method of claim 1, wherein the control signal causes the at least one vehicle system to alter the at least one operating parameter to decrease an energy consumption rate of the vehicle.

7. The method of claim 6, wherein the control signal causes at least one of a throttling system, a steering system, a braking system, a heating, ventilating, and an air conditioning system, an entertainment system, a suspension system, a tire pressure system, an active aerodynamic system, and an engine cooling system to alter the at least one operating parameter.

8. The method of claim 6, further comprising:
providing a plurality of parameters to a vehicle user;
detecting a user input; and
altering the at least one parameter of the at least one vehicle system based on the user input.

9. The method of claim 1, further comprising:
providing an indication to a vehicle user that the vehicle is operating in the economy mode.

10. The method of claim 1, wherein the predetermined energy condition includes at least one of receiving a request to locate an energy station, determining a user destination, and comparing the energy level of the vehicle with a predetermined threshold.

11. The method of claim 1, wherein entering the economy mode includes causing an autonomous vehicle or a semi-autonomous vehicle to enter the economy mode.

12. The method of claim 1, further comprising:
identifying one or more energy stations based on a user destination, a vehicle range, the geographical location of the vehicle, and operating hours of energy stations; and
wherein fueling at the one or more energy stations allows the vehicle to reach the user destination.

13. A system for modifying a vehicle operating profile comprising:
a controller configured to:
determine a predetermined energy condition based upon at least one input to the controller,
determine a geographic location of a vehicle based upon the at least one input to the controller,
identify at least one energy station as a function of a plurality of factors,
determine a vehicle range based on an energy level of the vehicle and a first mode of vehicle operation,
determine whether an energy saving condition is satisfied based on the vehicle range, a location of the at least one energy station, and the geographical location of the vehicle,
enter an economy mode when the energy saving condition is satisfied,
determine whether a fill is completed based upon the at least one input to the controller; and
exit the economy mode in response to determining that the fill is completed,
wherein, in the economy mode:
the controller sends a control signal to at least one vehicle system, and
the at least one vehicle system alters at least one operating parameter based upon the control signal.

14. The system of claim 13, wherein the controller is further configured to:
identify a plurality of energy stations based on user preferences;
output the plurality of energy stations to a user interface; and
receive a user input indicating a selected energy station.

15. The system of claim 13, wherein the economy mode includes one of limiting vehicle speed, limiting vehicle acceleration, modifying vehicle acceleration characteristics, and altering vehicle climate control system settings.

16. The system of claim 13, wherein the control signal causes the at least one vehicle system to alter the at least one operating parameter to decrease an energy consumption rate of the vehicle.

17. The system of claim 16, wherein the at least one vehicle system is identified from a throttling system, a steering system, a braking system, a heating, ventilating, and an air conditioning system, an entertainment system, a suspension system, a tire pressure system, an active aerodynamic system, and an engine cooling system.

18. A non-transitory computer readable medium storing computer-readable instructions therein, which when the instructions are read and executed by a computer cause the computer to:
determine a predetermined energy condition based upon at least one input to the computer;
determine a geographic location of a vehicle based upon the at least one input to the computer;
identify at least one energy station as a function of a plurality of factors;
determine a vehicle range based on an energy level of the vehicle and a first mode of vehicle operation;
determine whether an energy saving condition is satisfied based on the vehicle range, a location of the at least one energy station, and the geographical location of the vehicle;
enter an economy mode when the energy saving condition is satisfied;
determine whether a fill is completed based upon the at least one input to the computer; and
exit the economy mode in response to determining that the fill is completed,
wherein, in the economy mode:
the computer sends a control signal to at least one vehicle system, and
the at least one vehicle system alters at least one operating parameter based upon the control signal.

* * * * *